US011960245B2

(12) United States Patent
Mishima et al.

(10) Patent No.: US 11,960,245 B2
(45) Date of Patent: Apr. 16, 2024

(54) TIMEPIECE

(71) Applicant: Seiko Epson Corporation, Tokyo (JP)

(72) Inventors: Yoshio Mishima, Matsumoto (JP); Takumi Oshio, Shiojiri (JP); Yoshihiro Hidai, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 53 days.

(21) Appl. No.: 17/746,168

(22) Filed: May 17, 2022

(65) Prior Publication Data

US 2022/0373974 A1 Nov. 24, 2022

(30) Foreign Application Priority Data

May 18, 2021 (JP) ................................ 2021-083696

(51) Int. Cl.

*G04B 37/06* (2006.01)
*G04B 19/16* (2006.01)
*G04B 3/04* (2006.01)

(52) U.S. Cl.

CPC ........... *G04B 37/06* (2013.01); *G04B 19/166* (2013.01); *G04B 3/04* (2013.01)

(58) Field of Classification Search

CPC ...... G04B 37/06; G04B 19/166; G04B 27/04; G04B 3/04

See application file for complete search history.

(56) References Cited

U.S. PATENT DOCUMENTS

| | | | | | |
|---|---|---|---|---|---|
| 4,815,053 | A * | 3/1989 | Dal Busco | G04B 19/283 | 368/294 |
| 6,799,886 | B2 * | 10/2004 | Carrard | G04B 19/283 | 368/295 |
| 7,025,494 | B2 * | 4/2006 | Oomori | G04B 37/06 | 368/308 |
| 9,395,694 | B1 * | 7/2016 | Wong | G04B 19/286 | |
| 10,114,338 | B2 * | 10/2018 | Mollier | G04B 37/0463 | |
| 2002/0167866 | A1 | 11/2002 | Oomori et al. | | |
| 2003/0123332 | A1 * | 7/2003 | Hiranuma | G04B 19/286 | 368/295 |
| 2005/0254353 | A1 * | 11/2005 | Cogoli | G04G 21/00 | 368/281 |
| 2008/0068935 | A1 * | 3/2008 | Hiranuma | G04B 19/283 | 368/295 |

(Continued)

FOREIGN PATENT DOCUMENTS

| | | | |
|---|---|---|---|
| JP | 2002-328183 | A | 11/2002 |
| JP | 2018-146505 | A | 9/2018 |

*Primary Examiner* — Edwin A. Leon
*Assistant Examiner* — Sean R Brannon
(74) *Attorney, Agent, or Firm* — Harness, Dickey & Pierce, P.L.C.

(57) ABSTRACT

A timepiece includes a case including a protrusion protruding inward from an inner wall, a crown including a shaft passing through the side surface of the case, a head provided at one end of the shaft, and a drive wheel provided at the other end opposite from the one end of the shaft, an internal rotary ring provided in a position where the internal rotary ring overlaps with the protrusion in the plan view and having teeth that engage with the drive wheel, and elastic members disposed between the protrusion and the internal rotary ring and each including a convex section that engages with the teeth.

12 Claims, 14 Drawing Sheets

(56) References Cited

U.S. PATENT DOCUMENTS

| | | | | |
|---|---|---|---|---|
| 2010/0220561 | A1* | 9/2010 | Takeda | G04B 19/286 368/295 |
| 2015/0227113 | A1* | 8/2015 | Cattaneo | G04B 19/223 368/295 |
| 2019/0187619 | A1* | 6/2019 | Wahler | G04B 37/0041 |
| 2019/0278226 | A1 | 9/2019 | Iguchi | |

* cited by examiner

TIMEPIECE

The present application is based on, and claims priority from JP Application Serial Number 2021-083696, filed May 18, 2021, the disclosure of which is hereby incorporated by reference herein in its entirety.

BACKGROUND

1. Technical Field

The present disclosure relates to a timepiece.

2. Related Art

For example, JP-A-2002-328183 discloses an apparatus worn around a wrist and including an internal rotary ring used as a display member with a cushion disposed at the side surface of the internal rotary ring to prevent the internal rotary ring from rattling when not rotated.

In the technology disclosed in JP-A-2002-328183, however, when the internal rotary ring is not rotated, the internal rotary ring is held only by the cushion, so that a strong impact can undesirably cause unintentional movement of the internal rotary ring.

SUMMARY

A timepiece includes a case including a protrusion protruding inward from an inner wall, an operation section including a shaft passing through a side surface of the case, a head provided at one end of the shaft, and a drive wheel provided at another end opposite from the one end of the shaft, an internal rotary ring provided in a position where the internal rotary ring overlaps with the protrusion in a plan view and having a plurality of teeth that engage with the drive wheel, and an elastic member disposed between the protrusion and the internal rotary ring and including a convex section that engages with the teeth.

DESCRIPTION OF EXEMPLARY EMBODIMENTS

A description with reference to the following figures will be made by using three axes perpendicular to one another, an axis X, an axis Y, and an axis Z. The direction along the axis X is a “direction X”, the direction along the axis Y is a “direction Y”, and the direction along the axis Z is a “direction Z”, with the direction indicated by the arrow being the positive direction and the direction opposite the positive direction being a negative direction. The direction +Z is referred to as “upper” or “upward”, and the direction −Z is referred to as “lower” or “downward” in some cases, and viewing in the direction +Z is also referred to as a plan view or planar. It is assumed in the following description that a surface facing the positive side of the direction Z is an upper surface, and that a surface facing the negative side of the direction Z, which is the side opposite from the upper side, is a lower surface.

First Embodiment

The configuration of a timepiece 100 will be described with reference to FIG. 1.

Figure 1:
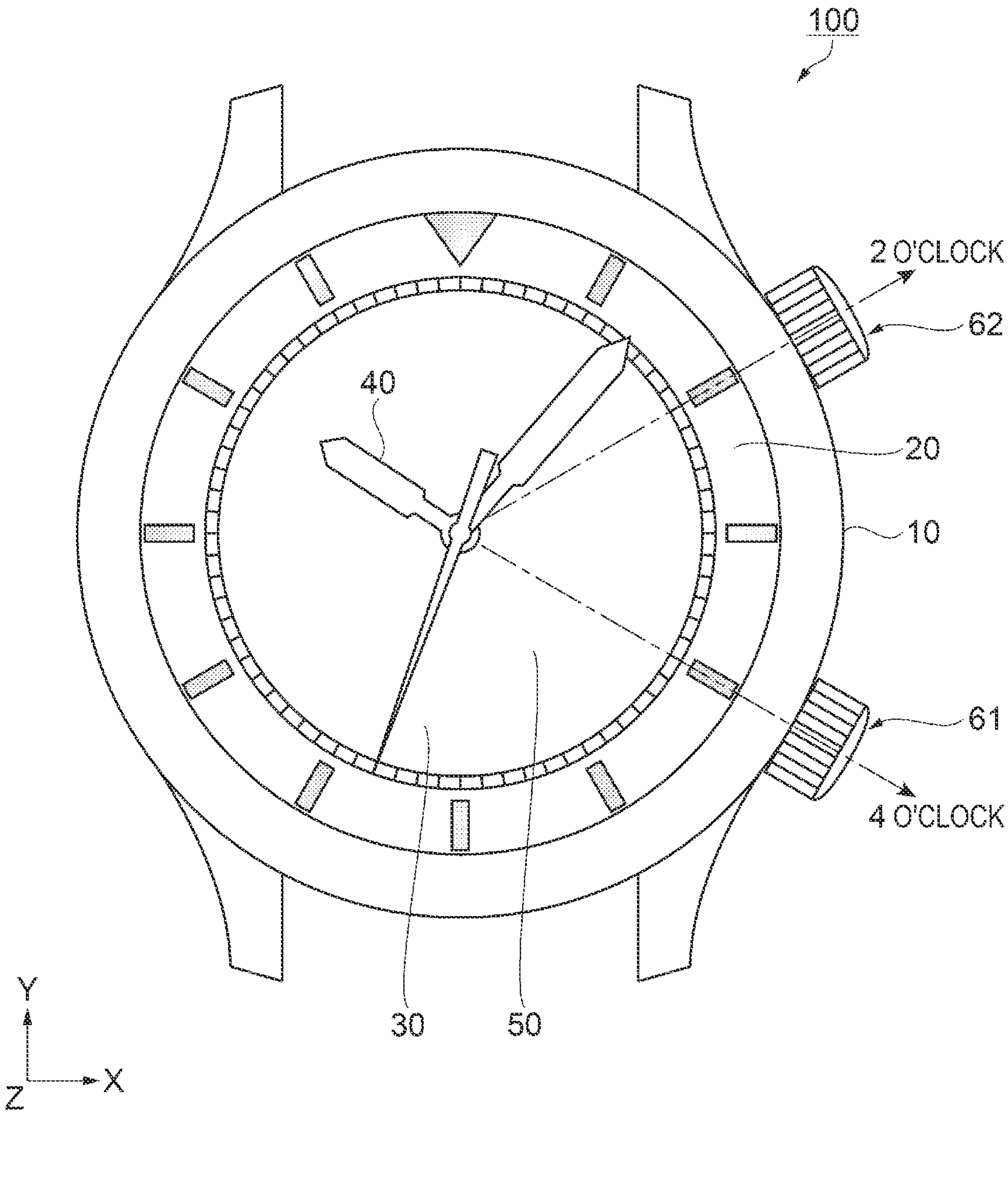
FIG. 1 is a plan view showing the configuration of a timepiece according to a first embodiment.

The timepiece 100 includes a flat, tubular case 10, as shown in FIG. 1. An internal rotary ring 20 and a dial 30 are disposed in the case 10. Indicating hands 40 including a second hand, a minute hand, and an hour hand are disposed at the dial 30.

A cover glass plate 50 is disposed at the top of the case 10 to cover the internal rotary ring 20, the dial 30, and the indicating hands 40. The displayed time can be visually recognized from the front side of the timepiece 100 through the cover glass plate 50. The visually recognized surface of each of the internal rotary ring 20 and the dial 30 is called a display surface.

Although not shown in the figures, a movement that drives the indicating hands 40 is accommodated in the case 10. The movement includes a stepper motor and a wheel train that drive the indicating hands 40, and a control circuit substrate that controls how to drive the stepper motor. The movement may be a mechanical movement powered by a spring.

Crowns 61 and 62, which allow adjustment and setting of the movement, the indicating hands 40, the internal rotary ring 20, and other components, are disposed at the side surface of the case 10, specifically, in positions facing in the 2 o’clock and 4 o’clock directions.

The configurations and functions of the internal rotary ring 20 and elastic members 70 will next be described with reference to FIGS. 2 to 9.

When the internal rotary ring 20 (see FIG. 3) is not rotated, specifically, when a shaft 64 of the crown 61 does not engage with a drive wheel 65 (see FIG. 4), the elastic members 70 are used to suppress unintentional rotation of the internal rotary ring 20 due, for example, to impact.

Although will be specifically described later, a first convex section 75*a* of a first elastic member 71 (see FIG. 7) engages with teeth 21 of the internal rotary ring 20, in addition to the drive wheel 65, to prevent the internal rotary ring 20 from rotating easily.

Figure 2:
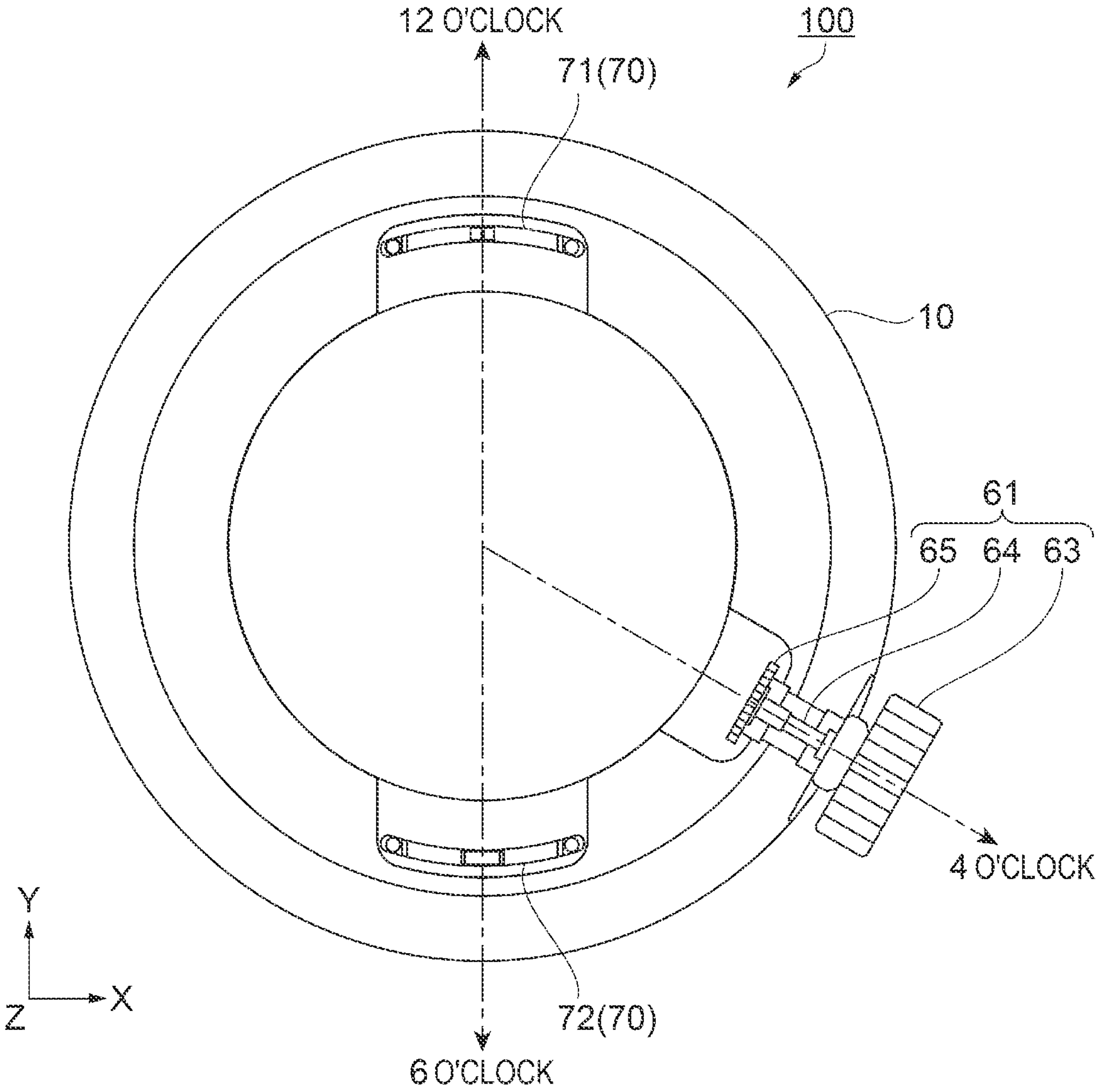
FIG. 2 is a plan view showing the configuration of the interior of the timepiece.

The elastic members 70 include the first elastic member 71 disposed in a position facing in the 12 o'clock direction in the case 10, and a second elastic member 72 disposed in a position facing in the 6 o'clock direction in the case 10, as shown in FIG. 2. The elastic members 70 are made, for example, of resin.

Figure 3:
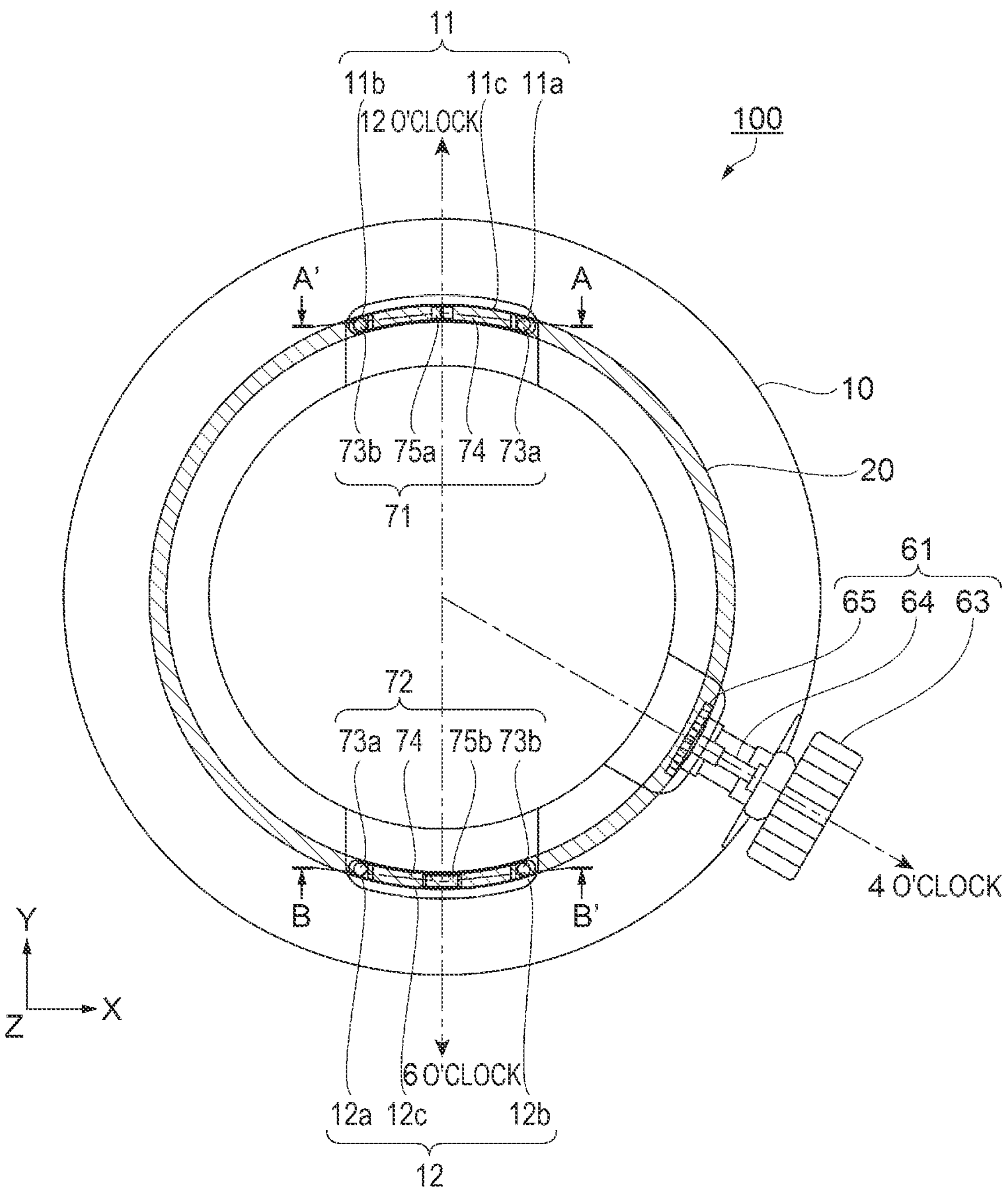
FIG. 3 is another plan view showing the configuration of the interior of the timepiece.

The internal rotary ring 20, which has an annular shape, is disposed over the first elastic member 71 and the second elastic member 72 along the circumferential direction, as shown in FIG. 3. The internal rotary ring 20 has, for example, a scale printed on the display surface. A plurality of teeth 21 (see FIG. 7) are formed at the rear surface of the internal rotary ring 20, the surface opposite from the display surface.

The timepiece 100 shown in FIG. 3 shows the state in which the teeth 21 of the internal rotary ring 20 engage not only with the first elastic member 71 and the second elastic member 72 but also with the drive wheel 65.

Figure 4:
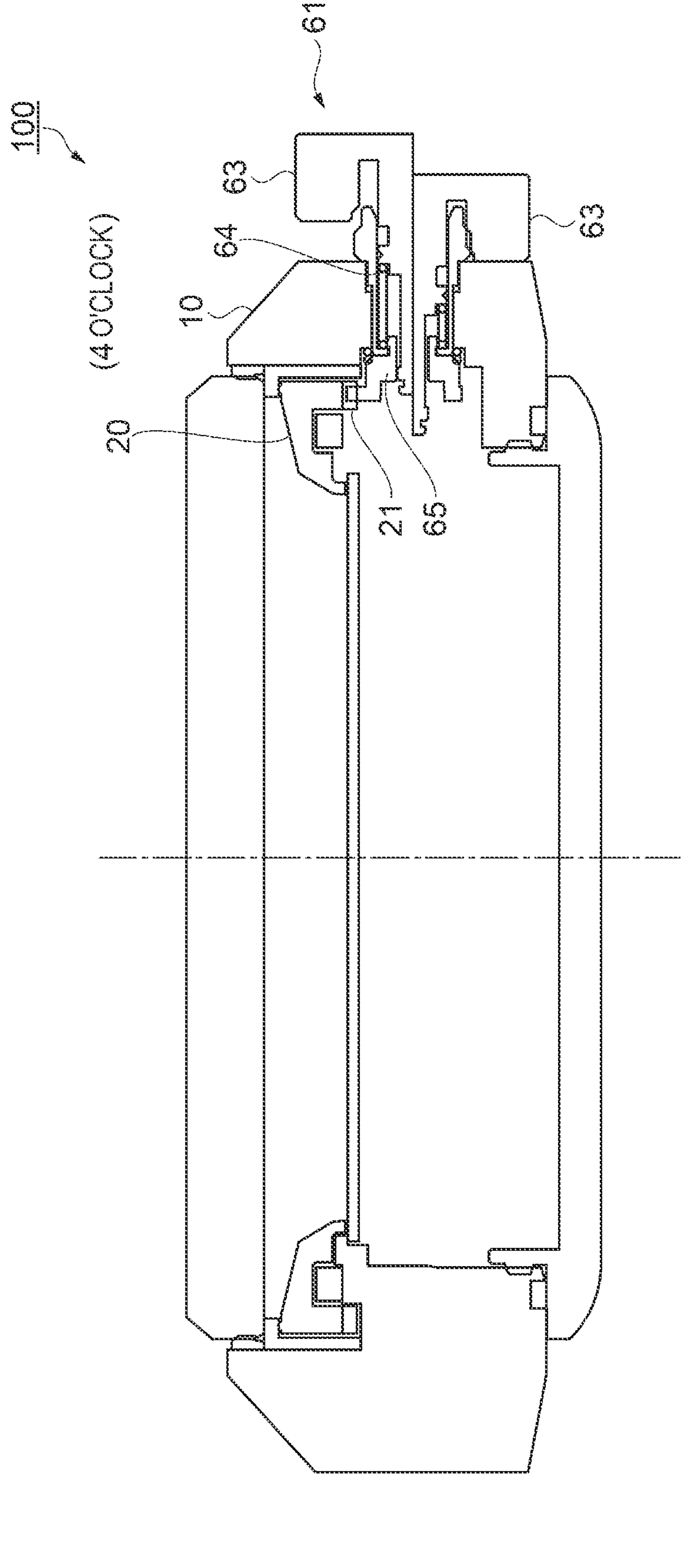
FIG. 4 is a cross-sectional view showing the configuration of the timepiece.

To rotate the internal rotary ring 20, the wearer of the timepiece 100 operates the crown 61 as an operation portion disposed in a position facing in the 4 o'clock direction of the timepiece 100, as shown in FIG. 4. The teeth 21 of the internal rotary ring 20 and the drive wheel 65 keep engaging with each other. When the crown 61 is pushed toward the case 10, the drive wheel 65 does not engage with the shaft 64, so that rotating the crown 61 does not rotate the internal rotary ring 20.

On the other hand, when the crown 61 is pulled away from the case 10, the drive wheel 65 engages with the shaft 64, and rotating the crown 61 rotates a head 63, which forms the crown 61, the shaft 64, which is coupled to the head 63 and passes through the case 10, and the drive wheel 65 coupled to the shaft 64, and in turn rotates the internal rotary ring 20.

Figure 5:
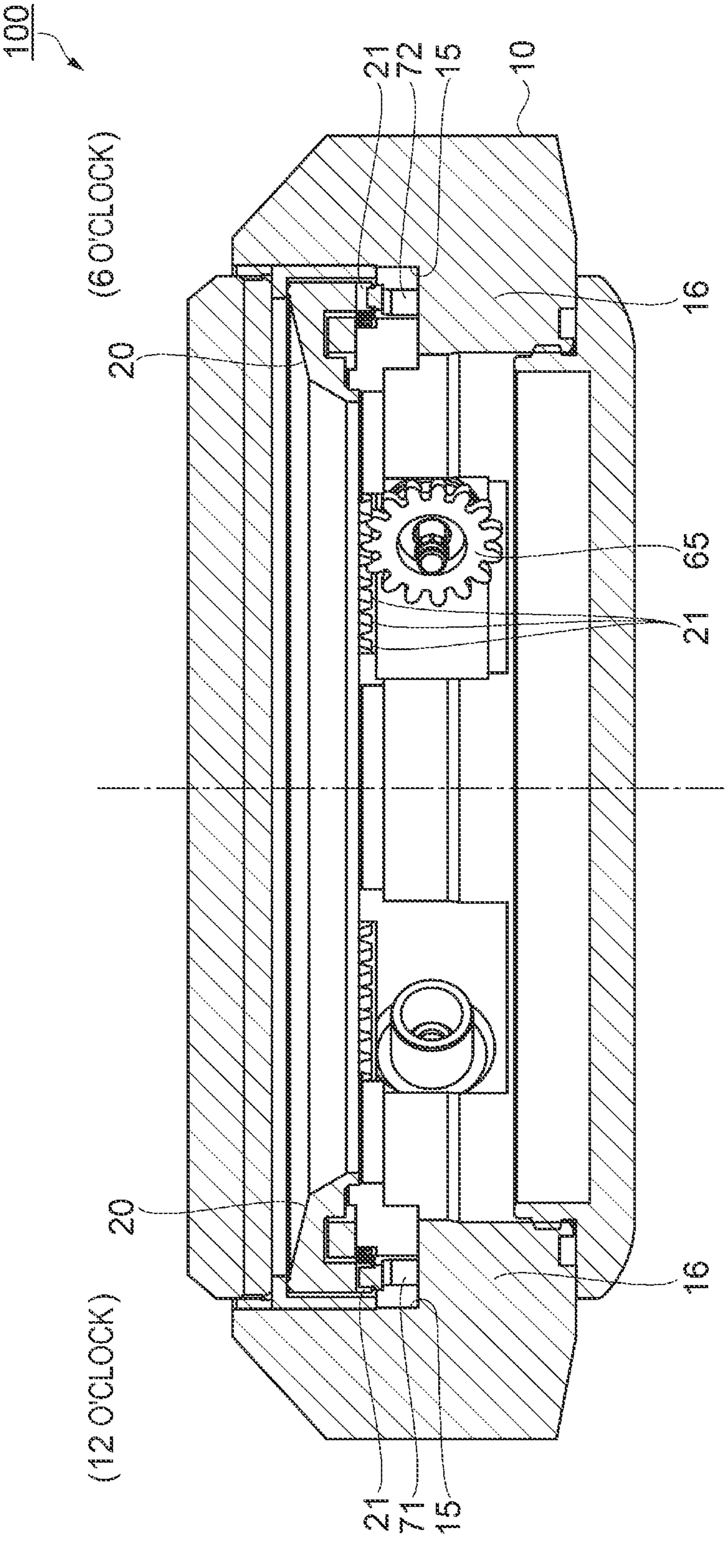
FIG. 5 is another cross-sectional view showing the configuration of the timepiece.

The first elastic member 71 and the second elastic member 72 keep engaging with the teeth 21 of the internal rotary ring 20, as shown in FIGS. 5 and 3. Specifically, the drive wheel 65 is disposed in a position facing in the o'clock direction in the case 10. The first elastic member 71 and the second elastic member 72 are disposed in positions facing in the 12 o'clock and 6 o'clock directions in the case 10, as described above. That is, the first elastic member 71 and the second elastic member 72 are disposed in positions where the two elastic members do not interfere with the drive wheel 65.

The case 10 includes a protrusion 16, which protrudes inward from an inner wall 15, as shown in FIG. 5. The internal rotary ring 20 is disposed in a position where the internal rotary ring 20 overlaps the protrusion 16 in the plan view and provided so as to engage with the drive wheel 65. The first elastic member 71 and the second elastic member 72 are disposed between the protrusion 16 and the internal rotary ring 20, and engage with the teeth 21 of the internal rotary ring 20. The inner wall 15 means the inner wall surface of a portion where the case is thin.

Figure 6:
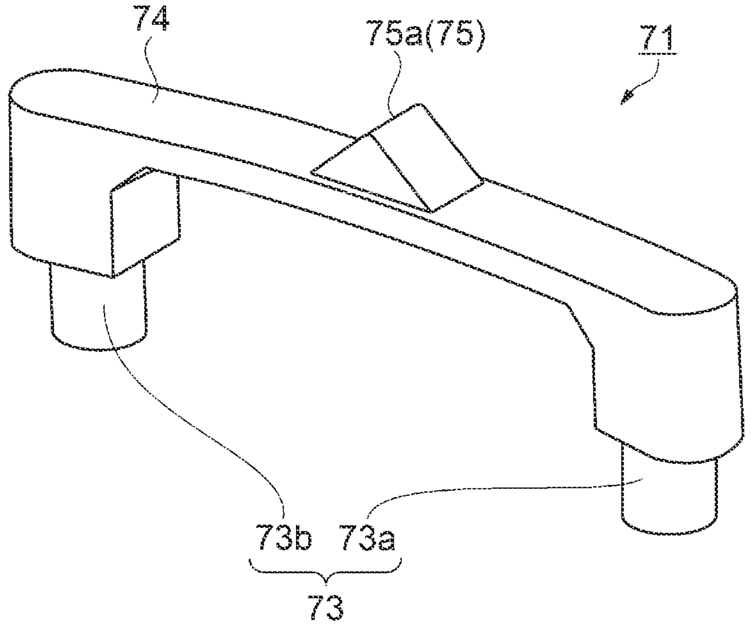
FIG. 6 is a perspective view showing the configuration of a first elastic member.

The first elastic member 71 includes legs 73, an extension extending from the legs 73, and a convex section coupled to the extension, as shown in FIG. 6. Specifically, the legs 73 include a first leg 73*a* and a second leg 73*b*. The extension is a beam 74, which extends between the first leg 73*a* and the second leg 73*b*. The convex section 75 is the first convex section 75*a*, which is provided substantially at the center of the beam 74 and has a triangular shape in the side view.

As described above, since the beam 74, which extends between the first leg 73*a* and the second leg 73*b*, is provided with the first convex section 75*a*, the first elastic member 71 can be stabilized, whereby a stable force produced by the first elastic member 71 allows the first convex section 75*a* to engage with the teeth 21. The configuration described above can suppress unintentional rotation of the internal rotary ring 20.

Figure 7:
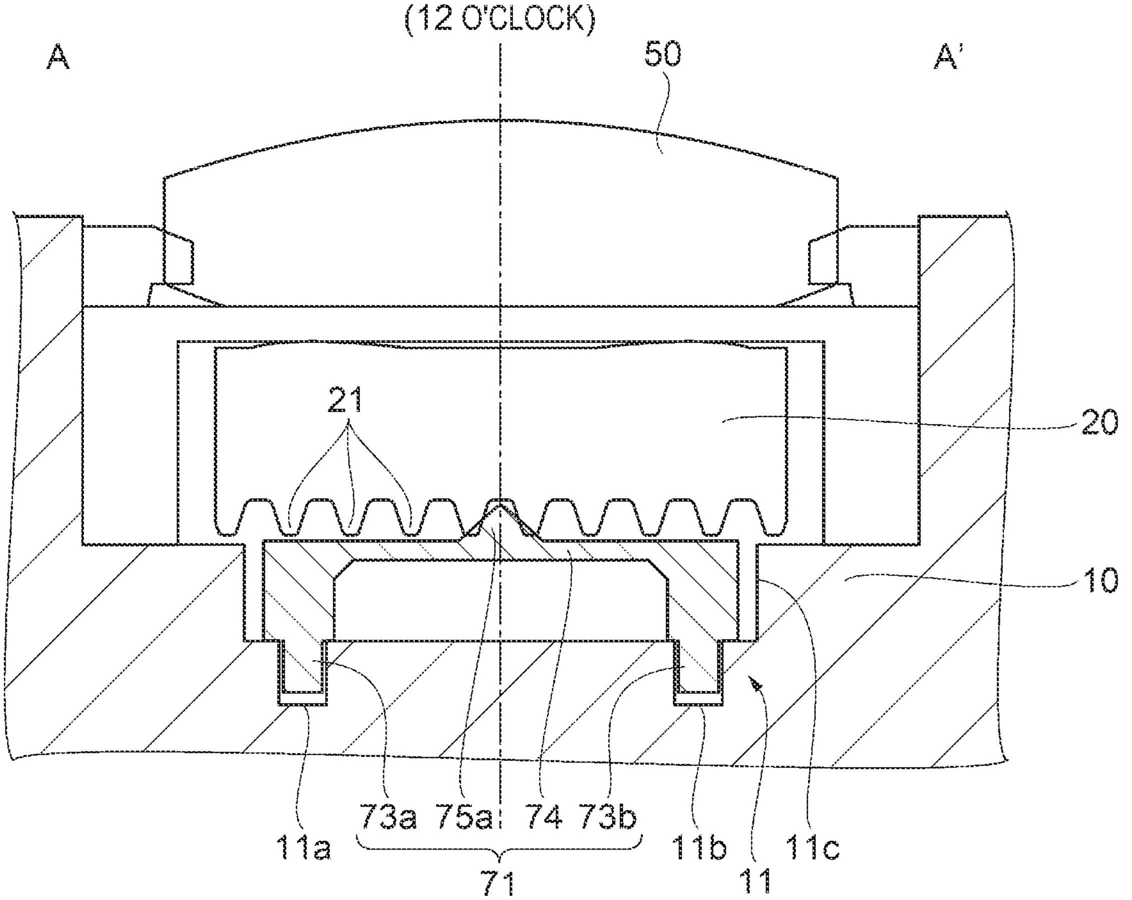
FIG. 7 is a cross-sectional view of the timepiece taken along the line A-A' shown in FIG. 3.

FIG. 7 is a cross-sectional view of the timepiece 100 taken along the line A-A' shown in FIG. 3. The first elastic member 71 is disposed in a recess 11 provided in the case 10, as shown in FIG. 7. Specifically, the recess 11 has a first recess 11*a*, into which the first leg 73*a* of the first elastic member 71 is fit, a second recess 11*b*, into which the second leg 73*b* of the first elastic member 71 is fit, and a third recess 11*c*, where the beam 74 of the first elastic member 71 is disposed.

The internal rotary ring 20 is disposed above the first elastic member 71. Specifically, the rear side of the internal rotary ring 20 is provided with the plurality of teeth 21, as described above. The first convex section 75*a* of the first elastic member 71 engages with one of the plurality of teeth 21 of the internal rotary ring 20.

The plurality of teeth 21 are formed, for example, of 60 teeth, for example, at uniform intervals in the circumferential direction. That is, the angle between adjacent teeth 21 is 6° in the plan view. The number of the teeth 21 and the angle therebetween are not limited to those described above. The first convex section 75*a* of the first elastic member 71 is formed so as to have substantially the same shape of the space between the teeth 21.

The engagement of the teeth 21 of the internal rotary ring 20 with the first convex section 75*a* of the first elastic member 71 can suppress unintentional rotation of the internal rotary ring 20 even when the shaft 64 of the crown 61 does not engage with the drive wheel 65. When the shaft 64 of the crown 61 engages with the drive wheel 65, and the internal rotary ring 20 is rotated in the circumferential direction, the first convex section 75*a* comes into contact with the teeth 21 at fixed intervals and can therefore provide a clicking sensation.

Figure 8:
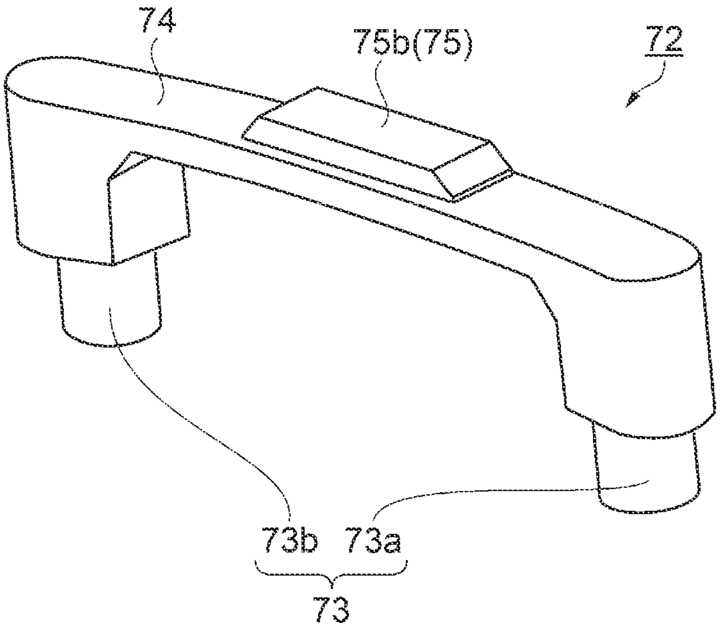
FIG. 8 is a perspective view showing the configuration of a second elastic member.

The second elastic member 72 includes the first leg 73*a*, the second leg 73*b*, the beam 74, which extends between the first leg 73*a* and the second leg 73*b*, and a second convex section 75*b*, which is provided substantially at the center of the beam 74 and has a substantially trapezoidal shape in the side view, as shown in FIG. 8. Specifically, the second convex section 75*b* has a flat portion longer than the interval between the teeth 21 of the internal rotary ring 20.

Figure 9:
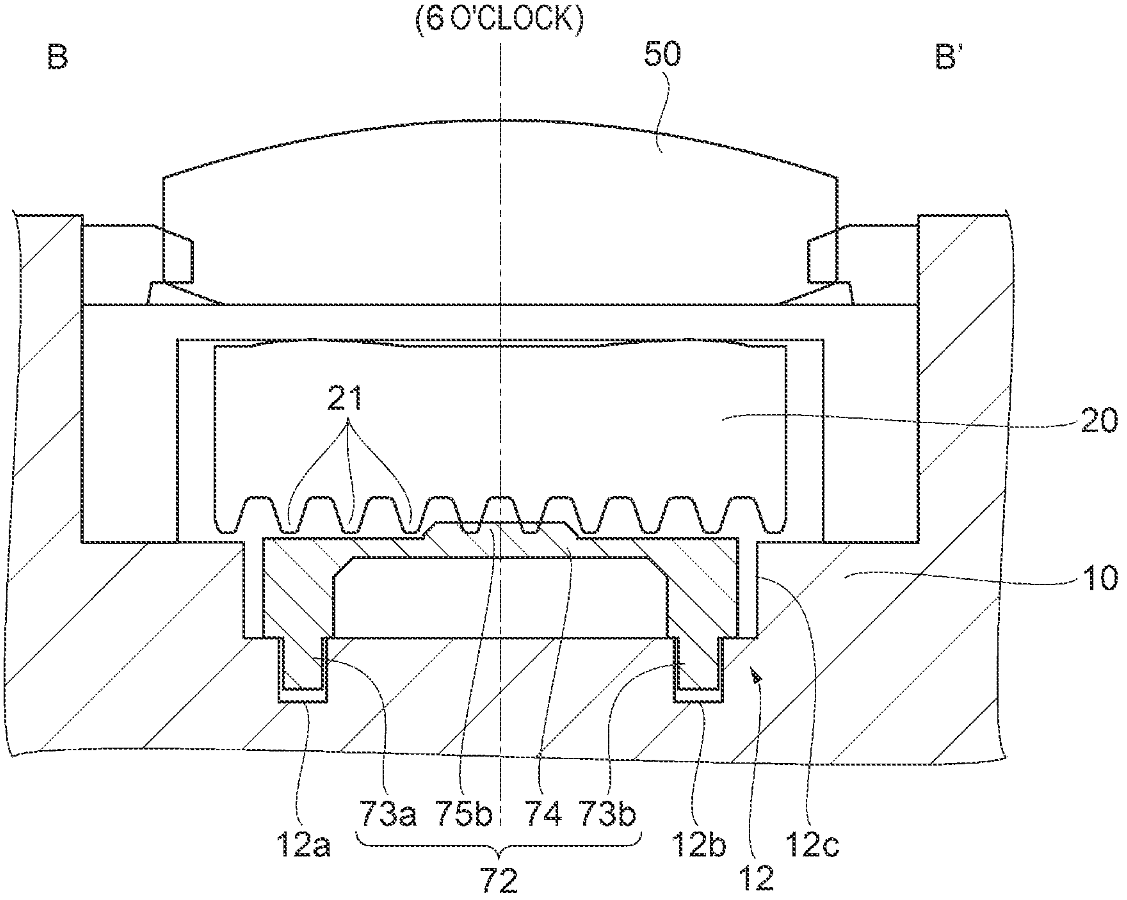
FIG. 9 is a cross-sectional view of the timepiece taken along the line B-B' shown in FIG. 3.

FIG. 9 is a cross-sectional view of the timepiece 100 taken along the line B-B' shown in FIG. 3. The second elastic member 72 is disposed in a recess 12 provided in the case 10, as shown in FIG. 9. Specifically, the recess 12 has a first recess 12*a*, into which the first leg 73*a* of the second elastic member 72 is fit, a second recess 12*b*, into which the second leg 73*b* of the second elastic member 72 is fit, and a third recess 12*c*, where the beam 74 of the second elastic member 72 is disposed.

The internal rotary ring 20 is disposed over the second elastic member 72. Specifically, the rear side of the internal rotary ring 20 is provided with the plurality of teeth 21, as described above. The second convex section 75*b* of the second elastic member 72 extends over and comes into contact with a plurality of the teeth 21 of the internal rotary ring 20 and presses the plurality of teeth 21 upward.

When the first convex section 75*a* of the first elastic member 71 engages with the teeth 21, the second convex section 75*b* of the second elastic member 72 presses the teeth 21 as described above and therefore suppresses rattling of the internal rotary ring 20. Furthermore, the first elastic member 71 and the second elastic member 72 support the internal rotary ring 20 and can therefore keep the internal rotary ring 20 balanced and suppress unintentional rotation of the internal rotary ring 20.

Moreover, since the internal rotary ring 20 is not rotating, a reference mark, the scale, and other symbols printed on the surface of the internal rotary ring 20 do not move during measurement, allowing accurate measurement. Diver watches, for example, need to accurately measure a diving period, and if the internal rotary ring 20 unintentionally moves during diving and other activities, the diving period cannot be measured accurately, but the structure described above allows more accurate measurement.

As described above, the timepiece 100 according to the present embodiment includes the case 10, which includes the protrusion 16 protruding inward from the inner wall 15, the crown 61, which includes the shaft 64 passing through the case 10, the head 63 provided at one end of the shaft 64, and the drive wheel 65 provided at the other end opposite from the one end of the shaft 64, the internal rotary ring 20 provided in a position where the internal rotary ring 20 overlaps with the protrusion 16 and having the teeth 21, which engage with the drive wheel 65, and the elastic members 71 and 72, which are disposed between the protrusion 16 and the internal rotary ring 20 and each include the convex section 75, which engages with the teeth 21.

According to the configuration described above, the provided elastic members 71 and 72 each including the convex section 75, which engages with the teeth 21, can suppress rotation of the internal rotary ring 20 even when the shaft 64 of the crown 61 does not engage with the drive wheel 65. When the crown 61 is rotated with the shaft 64 of the crown 61 engaging with the drive wheel 65, that is, the internal rotary ring 20 is rotated, the convex section 75 comes into contact with the teeth 21 at fixed intervals and can therefore provide a clicking sensation.

On the other hand, when the crown 61 is pulled away from the case 10, the drive wheel 65 engages with the shaft 64, and rotating the crown 61 rotates the head 63, which forms the crown 61, the shaft 64, which is coupled to the head 63 and passes through the case 10, and the drive wheel 65 coupled to the shaft 64, and in turn rotates the internal rotary ring 20.

In the timepiece 100, it is preferable that the legs 73 include the first leg 73*a* and the second leg 73*b*, that the extension is the beam 74, which extends between the first leg 73*a* and the second leg 73*b*, and that the beam 74 is provided with the convex section 75. According to the configuration described above, the convex section 75 provided at the beam 74 allows stable fixation of each of the entire elastic members 71 and 72, whereby a stable force produced by the elastic member allows the convex section 75 to engage with the teeth 21.

In the timepiece 100, the case 10 is preferably provided with the recesses 11 and 12, which hold the elastic members 71 and 72, respectively. According to the configuration described above, since the case 10 is provided with the recesses 11 and 12, which hold the elastic members 71 and 72, respectively, there is no need to prepare other members that hold the elastic members 71 and 72, whereby an increase in the thickness of the entire timepiece 100 can be suppressed.

In the timepiece 100, the elastic members 70 preferably include the first elastic member 71 and the second elastic member 72, which is disposed in a position different from the position of the first elastic member 71 or on the side opposite from the side where the first elastic member 71 is disposed in the in-plane direction of the internal rotary ring 20. The configuration described above, in which the first elastic member 71 and the second elastic member 72 engage with the internal rotary ring 20, can suppress inclination of the internal rotary ring 20 in one direction and hence suppress rattling thereof.

In the timepiece 100, it is preferable that the convex sections 75 include the first convex section 75*a*, which has a size equal to the interval between the teeth 21 of the internal rotary ring 20, or the second convex section 75*b*, which has a size greater than the interval between the teeth 21. According to the configuration described above, since the first convex section 75*a* and the second convex section 75*b* engage with the teeth 21, unintentional rotation of the internal rotary ring 20 can be suppressed.

Variations of First Embodiment

Figure 10:
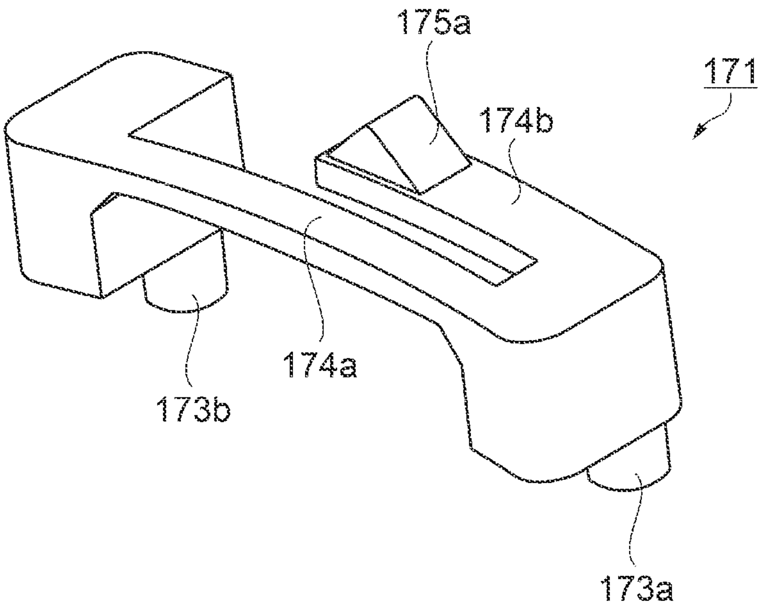
FIG. 10 is a perspective view showing the configuration of a first elastic member in a variation of the first embodiment.
Figure 11:
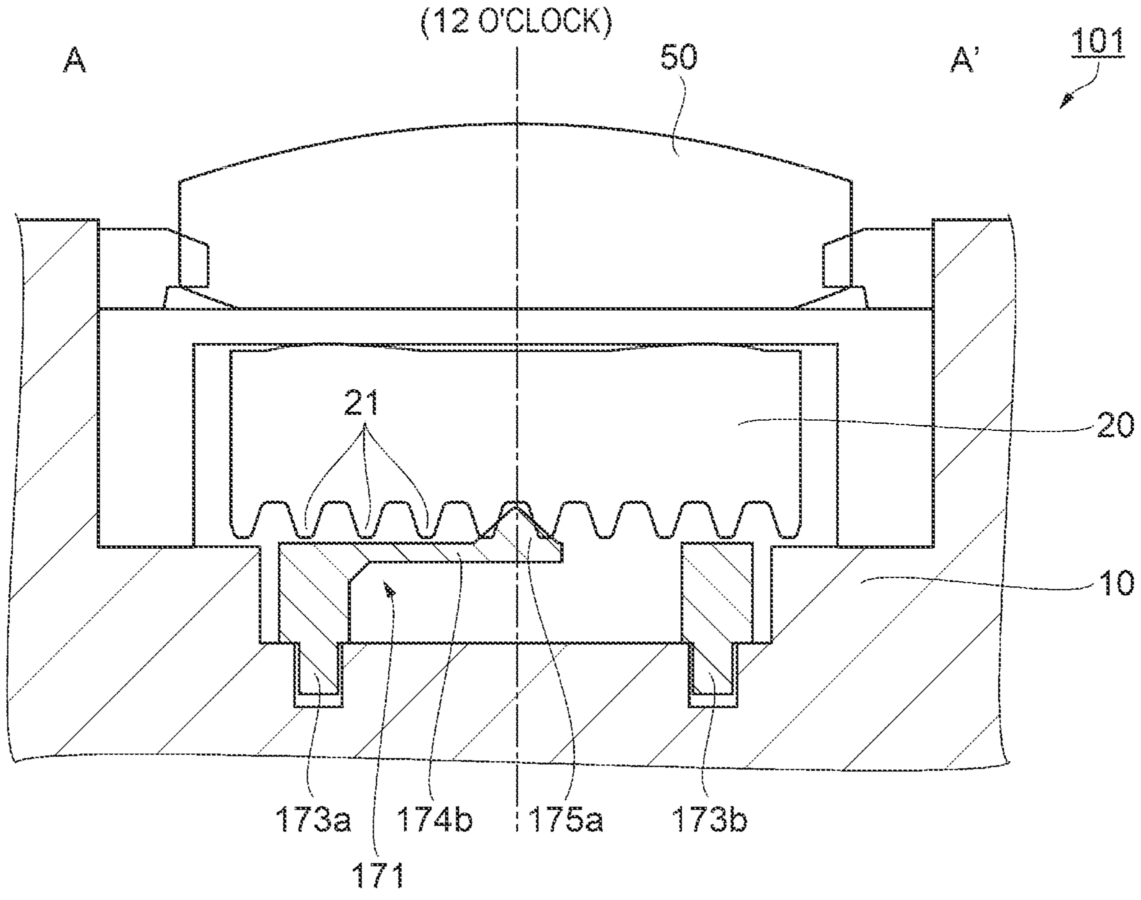
FIG. 11 is a cross-sectional view of a portion of a timepiece, the portion corresponding to the line A-A' shown in FIG. 3.
Figure 12:
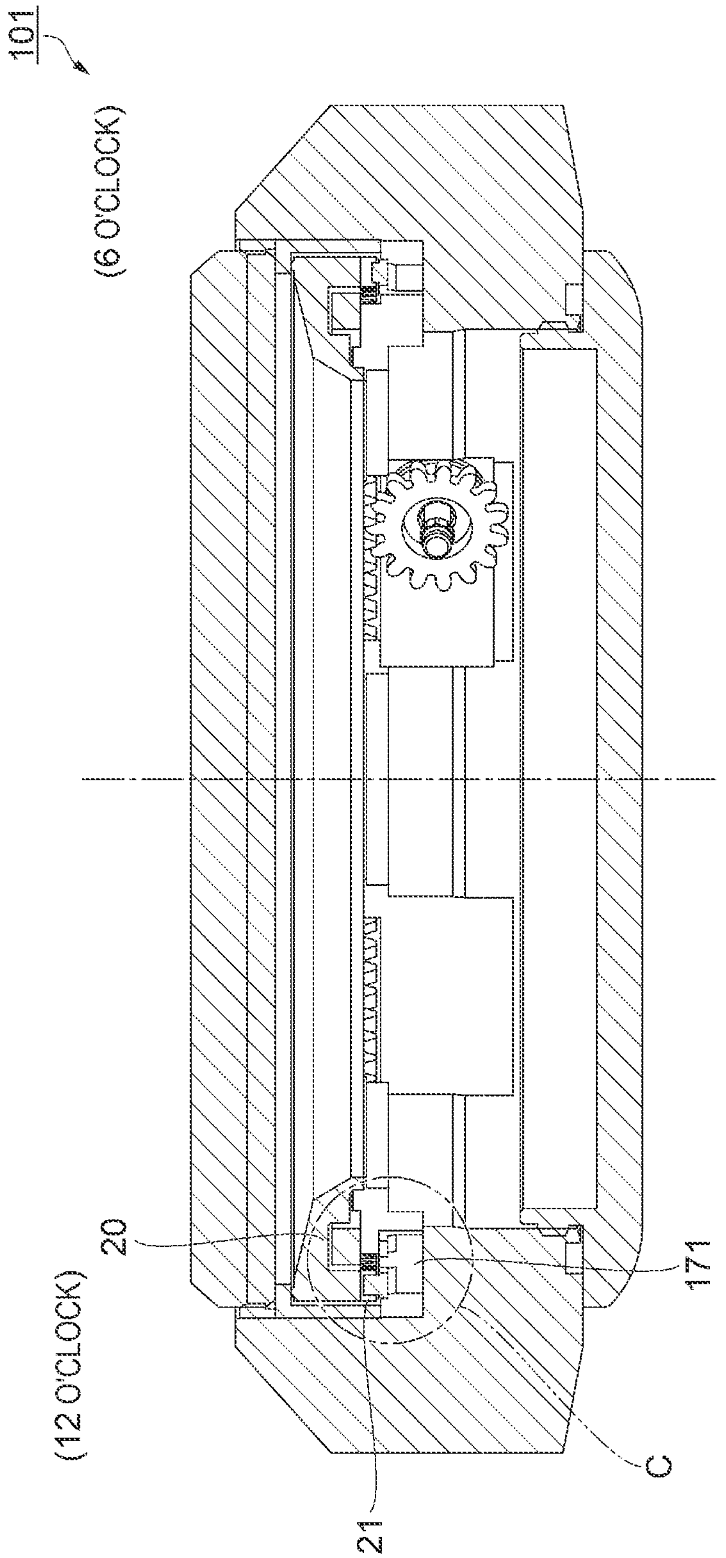
FIG. 12 is a cross-sectional view showing the configuration of a timepiece according to a variation.

As described above, the first elastic member 71 does not necessarily have the configuration in the first embodiment described above, and may have any of the configurations shown in FIGS. 10 to 12. A first elastic member 171 in a variation includes a first leg 173*a*, a second leg 173*b*, a beam 174*a*, which extends between the first leg 173*a* and the second leg 173*b*, an extension 174*b*, which extends from the first leg 173*a*, and a first convex section 175*a*, which is provided at one end of the extension 174*b*, as shown in FIG. 10. The first convex section 175*a* has a triangular shape in the side view, as in the embodiment described above.

FIG. 11 is a cross-sectional view of a portion of a timepiece 101, the portion corresponding to the portion of the timepiece 100 taken along the line A-A' shown in FIG. 3. FIG. 12 shows a state in which the first elastic member 171 is disposed in a section C in a position facing in the 12 o'clock direction in the timepiece 101 according to the variation.

Since the first elastic member 171 in the variation includes the first convex section 175*a* at the end of the extension 174*b*, in other words, the first convex section 175*a* is provided in the form of a cantilever, as shown in FIG. 11, the first elastic member 171 can exert an appropriate elastic force to the teeth 21, which engage with the first convex section 175*a*, whereby the internal rotary ring 20 can be readily rotated, and unintentional rotation of the internal rotary ring 20 can be suppressed. A moderate clicking sensation can further be provided.

As described above, in the timepiece 101 according to the variation, the first elastic member 171 preferably includes the first leg 173*a*, the extension 174*b*, which extends from the first leg 173*a*, and the first convex section 175*a*, which is coupled to the extension 174*b*. According to the configuration described above, the first elastic member 171, which includes the first leg 173*a*, the extension 174*b*, and the first convex section 175*a*, can exert a further elastic force to the first convex section 175*a*, which engages with the teeth 21, whereby the internal rotary ring 20 can be readily rotated, and unintentional rotation of the internal rotary ring 20 can be suppressed.

The second elastic member 72 is not necessarily disposed in a position circumferentially shifted by 180° from the position where the first elastic member 71 is disposed in the in-plane direction of the internal rotary ring 20, and only needs to be disposed in a position where the second elastic member 72 can horizontally support the internal rotary ring 20.

The teeth 21 of the internal rotary ring 20 keep engaging with the drive wheel 65, and when the crown 61 is pulled out, the shaft 64 engages with the drive wheel 65, but not necessarily. The drive wheel 65 may be fixed to the shaft 64, and when the crown 61 is pulled out, the drive wheel 65 may engage with the teeth 21 of the internal rotary ring 20. The rotational torque of the shaft 64 can thus be reliably transmitted to the drive wheel.

Second Embodiment

Figure 13:
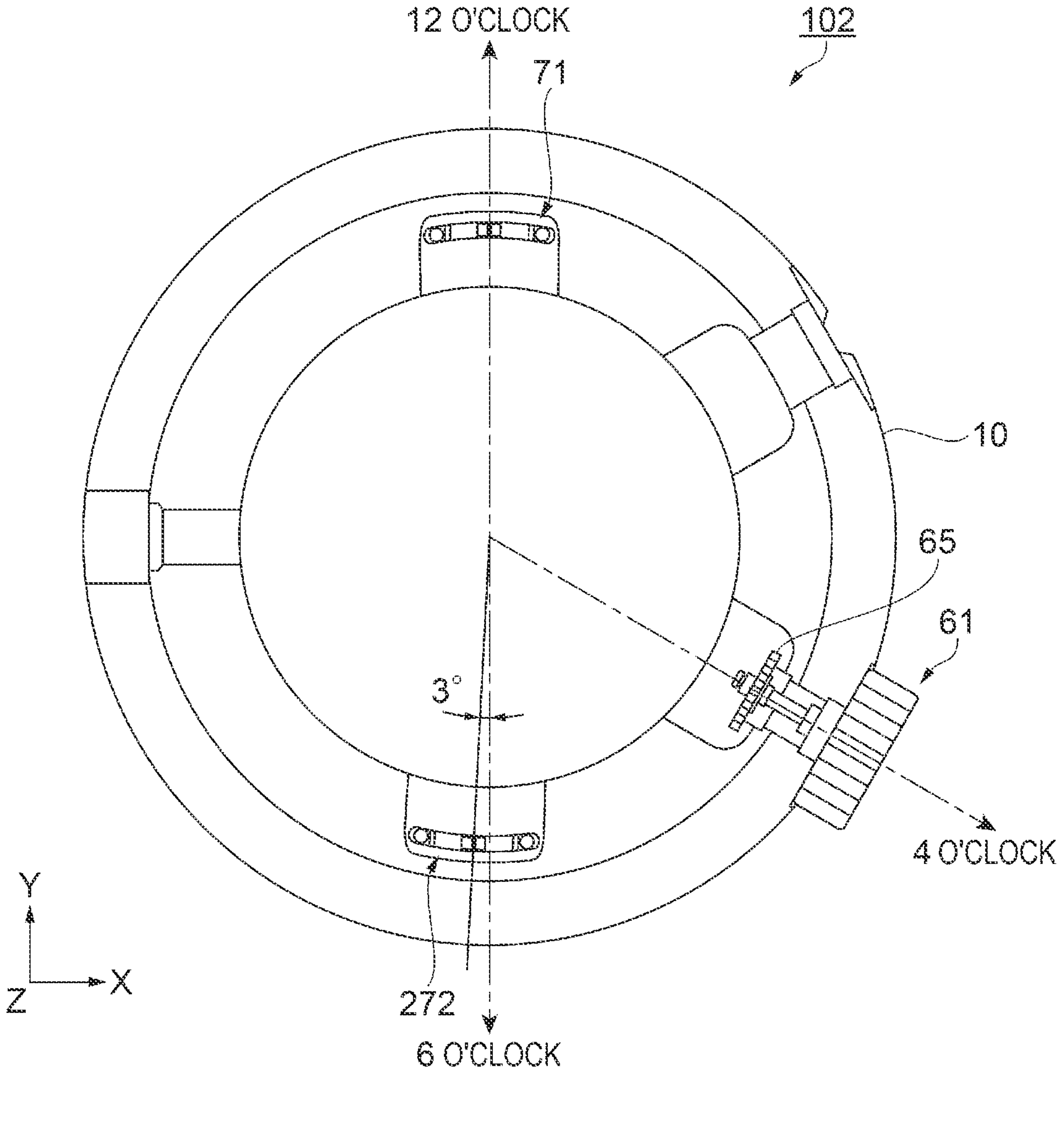
FIG. 13 is a plan view showing the configuration of the interior of a timepiece according to a second embodiment.
Figure 14:
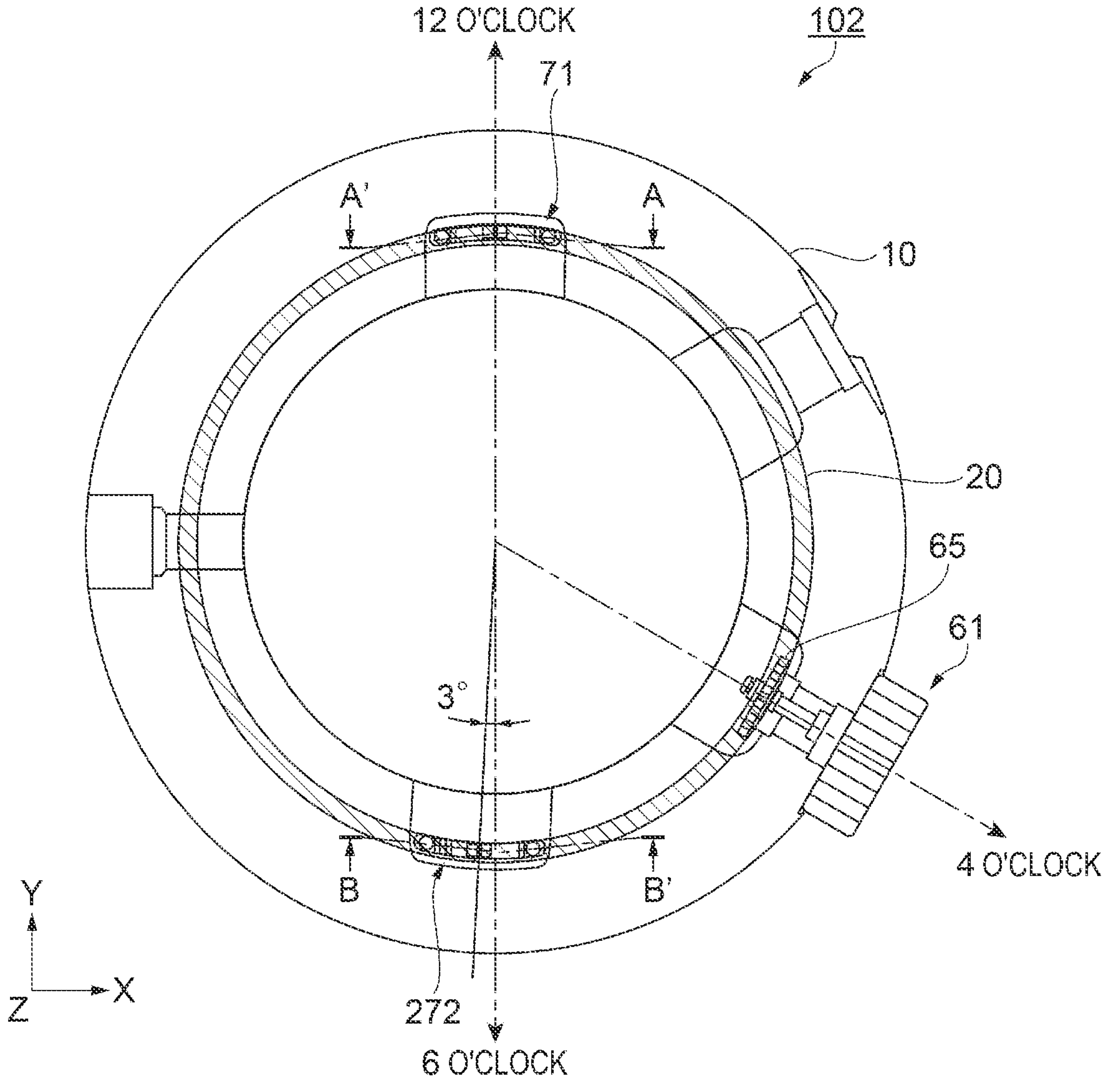
FIG. 14 is a plan view showing the configuration of the interior of the timepiece.
Figure 15:
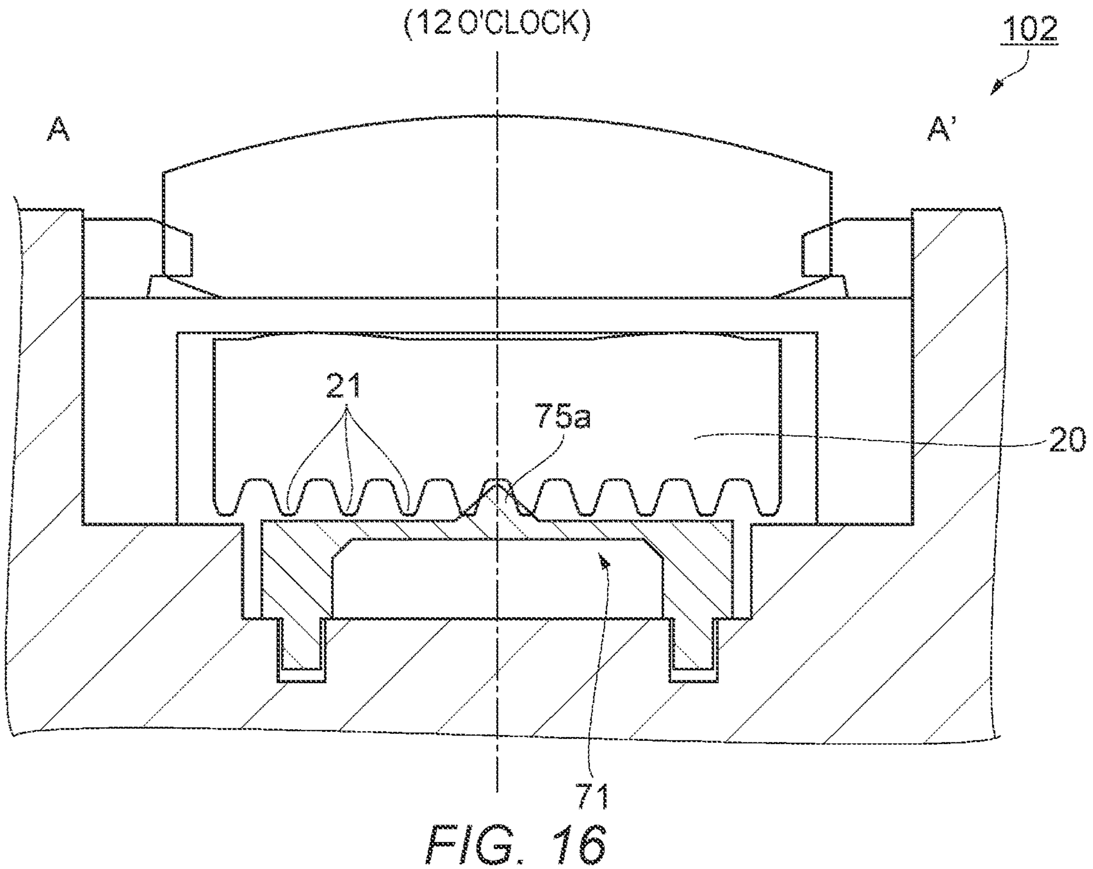
FIG. 15 is a cross-sectional view of the timepiece taken along the line A-A' shown in FIG. 14.
Figure 16:
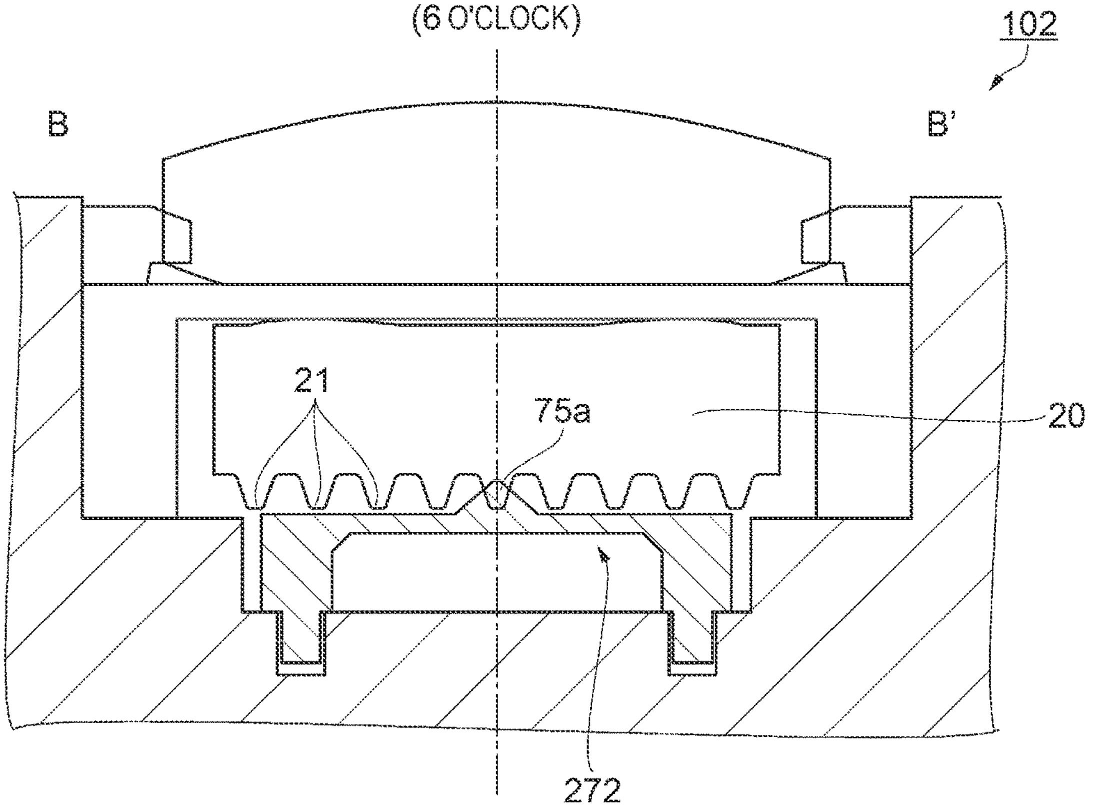
FIG. 16 is a cross-sectional view of the timepiece taken along the line B-B' shown in FIG. 14.

FIG. 13 is a plan view showing a configuration in which the first elastic member 71 and a second elastic member 272 are disposed in the case 10 of a timepiece 102 according to a second embodiment. FIG. 14 is a plan view showing a configuration in which the internal rotary ring 20 is added to the plan view shown in FIG. 13. FIG. 15 is a cross-sectional view showing the state of the first elastic member 71 disposed in a position facing in the 12 o'clock direction in the timepiece 102 and the internal rotary ring 20. FIG. 16 is a cross-sectional view showing the state of the second elastic member 272 disposed in a position facing in the 6 o'clock direction in the timepiece 102 and the internal rotary ring 20. The second elastic member 272 is provided with the first convex section 75*a*, as the first elastic member 71 is.

In the timepiece 102 according to the second embodiment, for example, the second elastic member 272 is disposed in a position shifted by 183° in the clockwise direction from the position where the first elastic member 71 is disposed, as shown in FIGS. 13 and 14. According to the configuration described above, when the first convex section 75*a* of the first elastic member 71 engages with the teeth 21, the apex of the first convex section 75*a* of the second elastic member 272 coincides with the apex of one of the teeth 21, as shown in FIGS. 15 and 16. That is, the first convex section 75*a* presses a tooth 21. The rattling of the internal rotary ring 20 can therefore be suppressed. Furthermore, the configuration of the second embodiment allows a sensation provided by 120 divided teeth in place of the sensation provided by the 60 divided teeth in the embodiment described above.

As described above, in the timepiece 102 according to the second embodiment, in which the first elastic member 71 and the second elastic member 272 each include the first convex section 75*a*, when the first convex section 75*a* of the first elastic member 71 is located between the teeth 21 of the internal rotary ring 20, the first convex section 75*a* of the second elastic member 272 is preferably located at the apex of a tooth 21 of the internal rotary ring 20.

According to the configuration described above, when the first convex section 75*a* of the first elastic member 71 is located between the teeth 21, that is, when the first convex section 75*a* engages with the teeth 21, the first convex section 75*a* of the second elastic member 272 is located at the apex of the tooth 21, that is, the first convex section 75*a* presses the tooth 21, whereby the rattling of the internal rotary ring 20 can be suppressed. In other words, the first convex section 75*a* of the second elastic member 272 is shifted from the first convex section 75*a* of the first elastic member 71 by half the interval with respect to the teeth 21. Therefore, when one of the first convex sections 75*a* engages with teeth 21, the other first convex section 75*a* presses the tooth 21.

Third Embodiment

Figure 17:
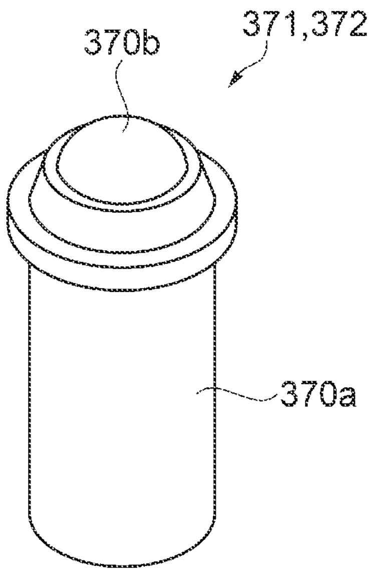
FIG. 17 is a perspective view showing the configuration of an elastic member in a third embodiment.
Figure 18:
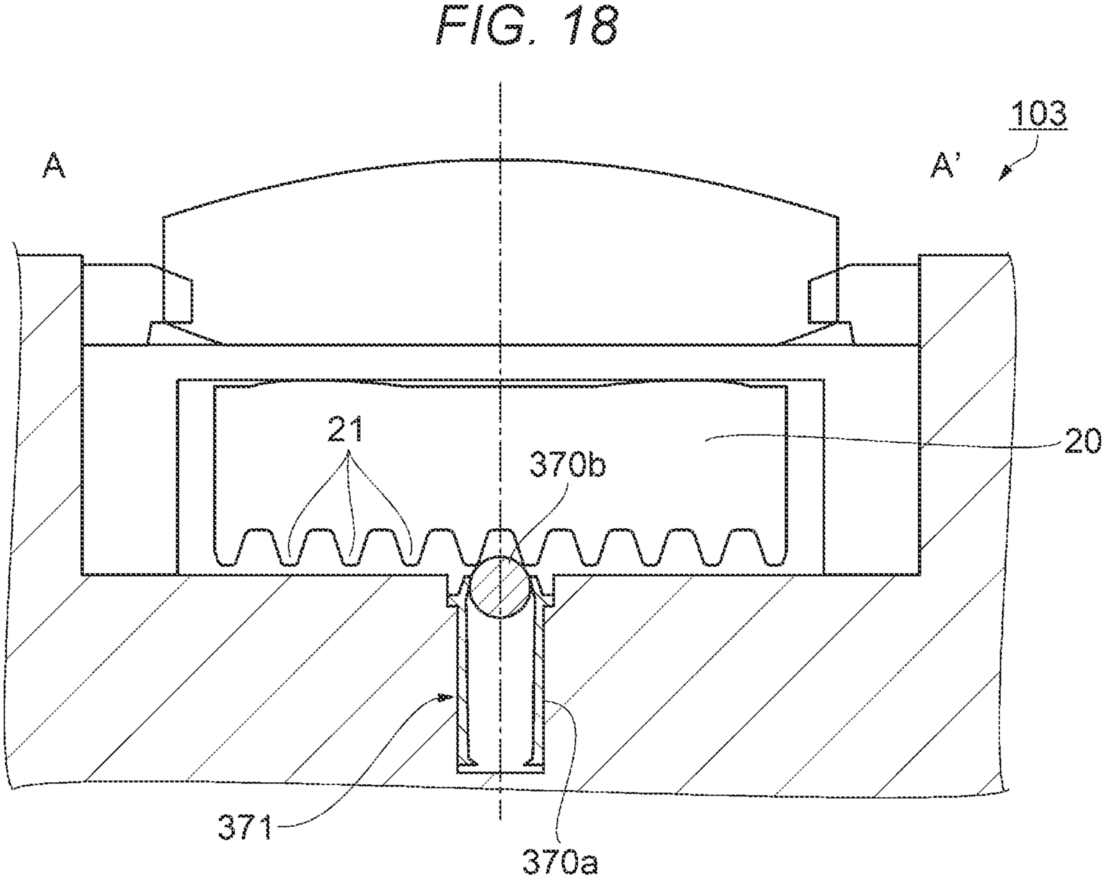
FIG. 18 is a cross-sectional view of a portion of a timepiece, the portion corresponding to the line A-A' shown in FIG. 3.
Figure 19:
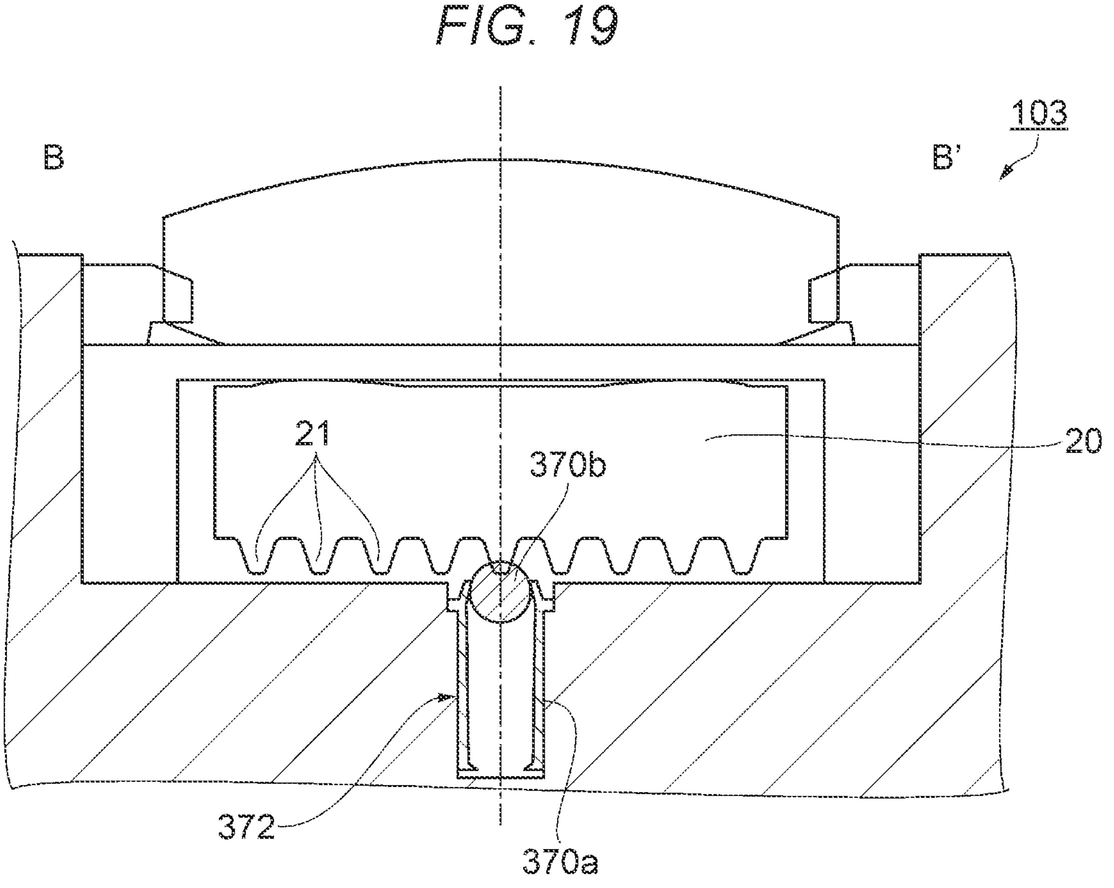
FIG. 19 is a cross-sectional view of a portion of the timepiece, the portion corresponding to the line B-B' shown in FIG. 3.

FIG. 17 is a perspective view showing the configuration of a first elastic member 371 and a second elastic member 372 in a third embodiment. FIG. 18 is a cross-sectional view of a portion of a timepiece 103 according to the third embodiment, the portion corresponding to the portion of the timepiece 100 taken along the line A-A' shown in FIG. 3. FIG. 19 is a cross-sectional view of a portion of the timepiece 103 according to the third embodiment, the portion corresponding to the portion of the timepiece 100 taken along the line B-B' shown in FIG. 3.

The elastic members 371 and 372 in the third embodiment each include a leg 370*a*, a third convex section 370*b* formed of a ball disposed at an upper portion of the leg 370*a*, and a spring that is not shown but is disposed in the leg 370*a*, as shown in FIG. 17. The third convex section 370*b* is urged upward by the elastic force produced by the spring. That is, the third convex section 370*b* moves upward and downward when a force from above is applied or lost.

In the timepiece 103 according to the third embodiment, when the third convex section 370*b* of the first elastic member 371 engages with the teeth 21, the apex of the third convex section 370*b* of the second elastic member 372 coincides with the apex of a tooth 21, as shown in FIG. 18. That is, the same state in the second embodiment shown in FIG. 16 described above is achieved.

The rattling of the internal rotary ring 20 can therefore be suppressed. Furthermore, the configuration of the third embodiment allows a sensation provided by 120 divided teeth in place of the sensation provided by the 60 divided teeth in the first embodiment described above.

Variations of the embodiments described above will next be described.

The first elastic member 71 and the second elastic member 72 are not necessarily provided with the differently shaped convex sections 75*a* and 75*b*, respectively, and the first elastic member 71 and the second elastic member 72 may be provided with convex sections having the same shape. Furthermore, the first elastic member 171 may be combined with the elastic members 371 and 372.

The first elastic member 71 and the second elastic member 72 are not necessarily made of resin and may each be formed, for example, of a metal spring or a coil spring made of a metal material. According to the configuration described above, the elastic members 71 and 72 made of resin or metal can each function as an elastic component.

What is claimed is:

1. A timepiece comprising:

a case including a protrusion protruding inward from an inner wall;

an operation section including a shaft passing through a side surface of the case, a head provided at one end of the shaft, a drive wheel provided at the other end of the shaft;

an internal rotary ring provided in a position where the internal rotary ring overlaps with the protrusion in a plan view and including a plurality of teeth, a part of the plurality of teeth engaging with the drive wheel; and an elastic member disposed between the protrusion and the internal rotary ring in the plan view and including a convex section that engages with the plurality of teeth, wherein the elastic member is configured with a beam, a first leg, a second leg, and the convex section, the beam extends along a first direction, and the first and second legs downwardly extend from both ends of the beam, respectively, along a second direction perpendicular to the first direction, and the convex section is located at a center of the beam and upwardly protrudes along the second direction.

2. The timepiece according to claim 1, wherein the case is provided with a recess that holds the elastic member.

3. The timepiece according to claim 1, wherein the convex section comes into contact with and presses the plurality of teeth.

4. The timepiece according to claim 1, wherein the elastic member includes a first elastic member and a second elastic member, and the first and second elastic member are located at different positions of the internal rotary ring.

5. The timepiece according to claim 4, wherein, when the convex section of the first elastic member is located between two teeth of the plurality of teeth of the internal rotary ring, the convex section of the second elastic member is located at an apex of one tooth of the plurality of teeth of the internal rotary ring.

6. The timepiece according to claim 1, wherein the elastic member is made of a resin or a metal.

7. A timepiece comprising:

a case including a protrusion protruding inward from an inner wall;

an operation section including a shaft passing through a side surface of the case, a head provided at one end of the shaft, a drive wheel provided at the other end of the shaft;

an internal rotary ring provided in a position where the internal rotary ring overlaps with the protrusion in a plan view and including a plurality of teeth, a part of the plurality of teeth engaging with the drive wheel; and an elastic member disposed between the protrusion and the internal rotary ring in the plan view and including a convex section that engages with the plurality of teeth, wherein the elastic member is configured with a beam, a first leg, a second leg, a cantilever beam, and the convex section, the beam extends along a first direction, and the first and second legs downwardly extend from first and second ends of the beam, respectively, along a second direction perpendicular to the first direction, the cantilever beam extends along the first direction from the first end of the beam toward a center of the beam, and the convex section is located at a distal end of the cantilever beam and upwardly protrudes along the second direction.

8. The timepiece according to claim 7, wherein the case is provided with a recess that holds the elastic member.

9. The timepiece according to claim 7, wherein the convex section comes into contact with and presses the plurality of teeth.

10. The timepiece according to claim 7, wherein the elastic member includes a first elastic member and a second elastic member, and the first and second elastic members are located at different positions of the internal rotary ring.

11. The timepiece according to claim 10, wherein, when the convex section of the first elastic member is located between two teeth of the plurality of teeth of the internal rotary ring, the convex section of the second elastic member is located at an apex of one tooth of the plurality of teeth of the internal rotary ring.

12. The timepiece according to claim 7, wherein the elastic member is made of a resin or a metal.

* * * * *